Figures 1, 2:
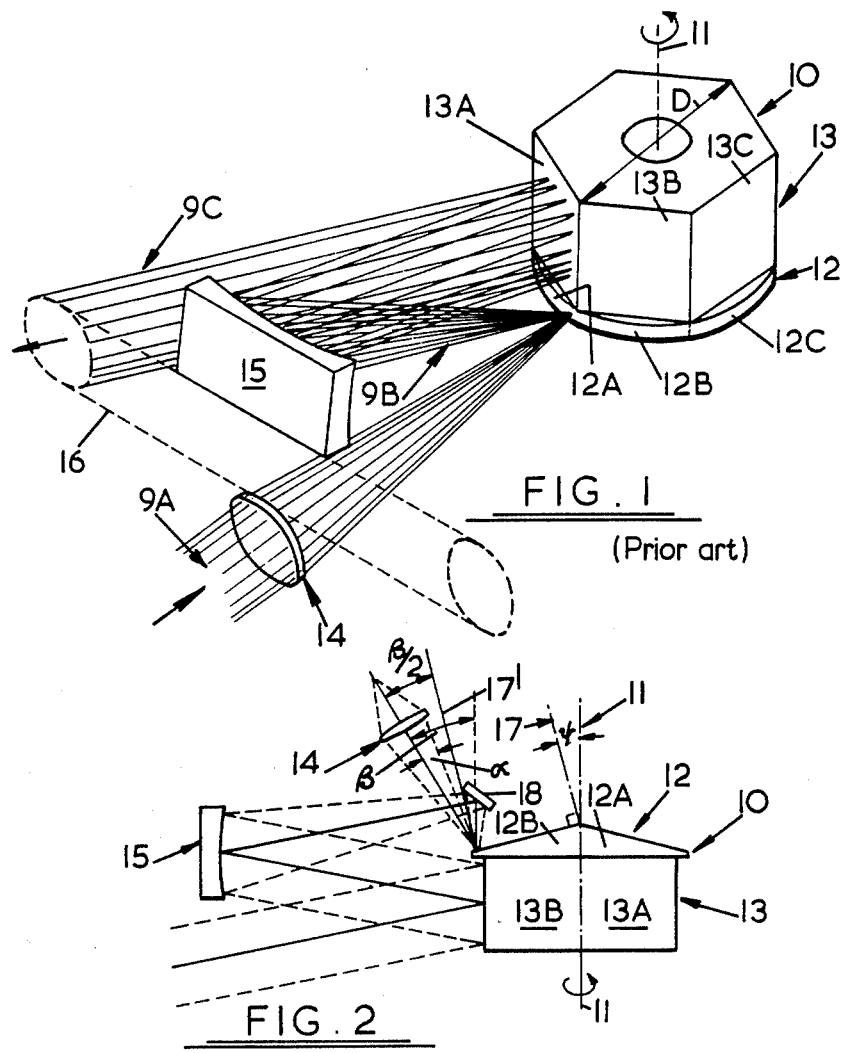

United States Patent [19]

Runciman

[11] Patent Number: 4,461,534
[45] Date of Patent: Jul. 24, 1984

[54] OPTICAL SCANNING SYSTEM WITH TWO SEQUENTIAL REFLECTION STATIONS

[75] Inventor: Herbert M. Runciman, Glasgow, Scotland

[73] Assignee: Barr & Stroud Limited, Glasgow, Scotland

[21] Appl. No.: 440,701

[22] Filed: Nov. 10, 1982

[30] Foreign Application Priority Data

Nov. 25, 1981 [GB] United Kingdom ............ 8135500

[51] Int. Cl.$^3$ ............................................. G02B 27/17
[52] U.S. Cl. ......................................... 350/6.8; 350/6.7
[58] Field of Search ............. 350/6.7, 6.8, 1.1, 1.2, 350/1.3, 1.4; 250/236

[56] References Cited
FOREIGN PATENT DOCUMENTS 3022365  5/1981  Fed. Rep. of Germany ....... 350/6.8
777623  11/1980  U.S.S.R. ............................ 350/6.7

Primary Examiner—Jon W. Henry
Attorney, Agent, or Firm—Mason, Fenwick & Lawrence

[57] ABSTRACT

An optical scanning system comprises a rotor assembly (10) rotatable about axis (11) and having a first reflective zone (12) composed of planar facets (12A, 12B, 12C, etc.) and a second reflective zone (13) composed of facets (13A, 13B, 13C etc.) which may be planar or curved. An array of radiation detectors (26) is focussed by static focussing means (14) at a first reflection station through which the facets of the first zone (12) sequentially pass. Further static optical means (15) are provided to direct radiation between the first reflection station and a second reflection station through which the facets of the second zone (13) sequentially pass. The facets (12A, 12B, 12C etc.) of the first reflective zone (12) each have a normal disposed at an angle $\psi$ to the rotational axis (11); the incident and reflected radiation beams at the first reflection station each have a half cone angle $\alpha$ as determined by optical means (14) and the principal ray of the incident and reflected conical beams each subtend an angle of $\beta/2$ to the normal (17) of the facets (12A, 12B, 12C etc). The angles $\alpha$, $\beta$ and $\psi$ conform to the relationship $$\sin \psi \cdot \cos \beta/2 = (\alpha \cdot N)/360$$

where $\alpha$ is in degrees and $N$ is the number of facets (12A, 12B 12C etc) and (13A, 13B, 13C etc) in each of the first and second reflective zones (12, 13).

4 Claims, 5 Drawing Figures

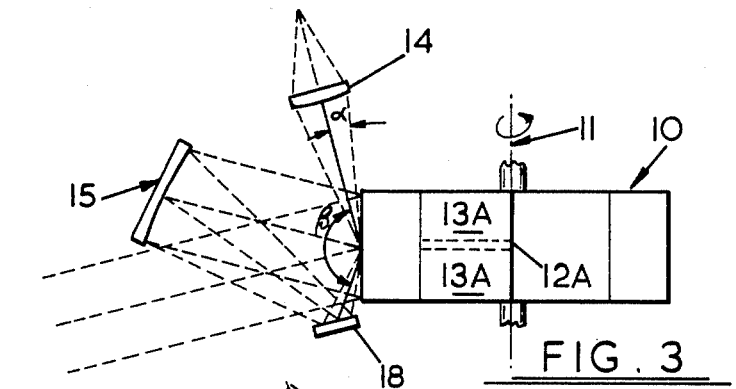
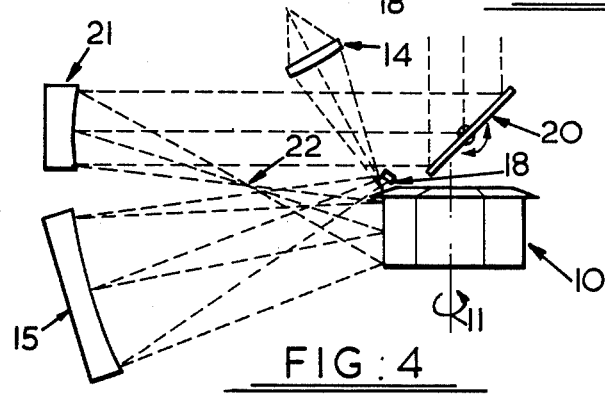
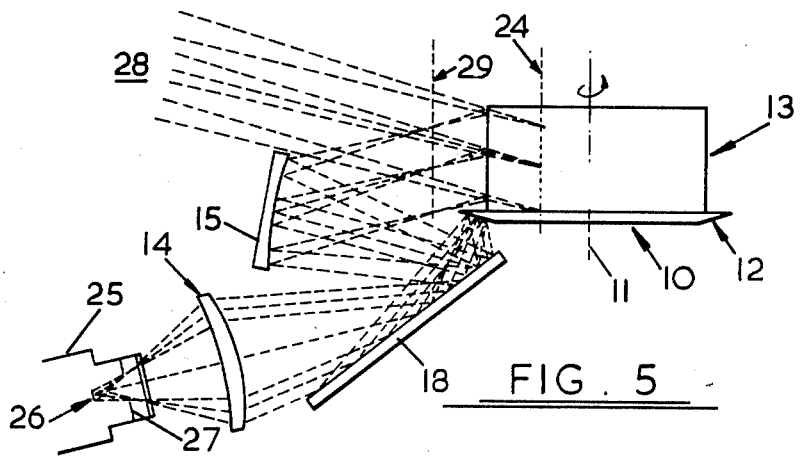

OPTICAL SCANNING SYSTEM WITH TWO SEQUENTIAL REFLECTION STATIONS

This invention relates to optical scanning systems.

For many purposes, such as optical character recognition, laser scanning or thermal imaging, there is a requirement to scan an optical beam rapidly and repetitively across a target or scene. This is usually accomplished by means of a multi-facetted reflective rotor placed in the beam path so that each successive facet deflects the beam along the same scan locus; or, if the pyramidal angles of successive facets differ, along different loci to scan an area rather than a single line. The efficiency of such systems, defined as the ratio of the period of active scanning to the total period, is usually limited to fairly modest values since a high efficiency implies a large size of rotor and this is impractical because of the slow scanning speed available and high windage losses. The limitation in efficiency of such conventional scan rotors is due to the movement of the rotor facets past the incident beam which is stationary in the direction of rotor movement. During the active scan period the whole of the incident beam must be reflected by the same rotor facet, so that the width of each facet must be greater than that of the beam by an amount dependent on the desired scan efficiency.

Optical scanning systems for overcoming this limitation have been described in German Patent Specification DOS No. 3022365 and in U.K. Patent Specification No. 1419940, in both of which the beam incident on the rotor facet is caused to track the moving facet so as to remain centred on the facet at all times during a scan period, and to switch rapidly to the following facet in preparation for the following facet period. This is achieved by causing the beam to be reflected from a component rotating synchronously with the rotor prior to being incident upon the rotor, optics being provided so that at this prior reflection the beam is as narrow as possible whilst at the reflection from the reflective rotor it is equal in width to the rotor facet.

These double-reflection systems suffer from two defects. Firstly, the rotating component providing the first beam reflection is disposed in such a way that it requires to have curved reflective surfaces nearly concentric with its axis of rotation in order to constrain the angular movement of the reflected beam to equal the angular movement of the reflective rotor to achieve the desired tracking effect, and consequently this component is difficult and costly to manufacture with the required surface quality. Secondly, and more fundamentally, if image quality is important the system can only be used with a point-sized detector (or radiation source). This occurs because the intermediate image of the detector (or radiation source) is formed on or very close to the curved surface from which the beam is first reflected. The curvature of this surface has two effects—it introduces field curvature of the detector image, and it causes the principal rays corresponding to different detector elements within the detector array to diverge. The larger the detector array the greater is the field curvature and principal ray divergence and for any but the smallest detector arrays these defects must be corrected by the addition of complex compensating optical components, while for large detector arrays such correction becomes impractical because the divergence is so great, and may be asymmetric, that it becomes impossible to fold the optical paths in such a way as to allow free passage of radiation.

It is an object of the present invention to provide a dual-reflection optical scanning system of relatively simple construction and which obviates or mitigates the foregoing disadvantages whilst retaining a high scanning efficiency.

According to the present invention there is provided an optical scanning system comprising a rotor assembly having first and second reflective zones each composed of a plurality (N) of circumferentially-contiguous facets, respective facets of the first zone being angularly coextensive with respective facets of the second zone and sequentially passing through respective first and second reflection stations upon rotation of the rotor assembly about its axis of rotation, static focussing means arranged to direct radiation in a beam between an array of radiation detectors or emitters and the first-reflection station with the array and the first reflection station located at conjugate foci of the focussing means, and static optical means arranged to direct radiation in a beam between the first and second reflection stations, wherein (a) the facets of the first reflective zone are each planar having a normal disposed at an angle $\psi$ to the rotation axis of the rotor assembly, (b) the incident and reflected radiation beams at the first reflection station each have a half cone angle $\alpha$ and the principal ray of the incident and reflected beams each subtend an angle $\beta/2$ to the normal of each facet in the first reflection station when each said normal is coplanar with said principal rays, and (c) the angles $\alpha$, $\beta$ and $\psi$ conform to the relationship:

$$\sin \psi \cdot \cos \beta/2 = \frac{\alpha \cdot N}{360} \quad (\alpha \text{ in degrees}).$$

By virtue of the present invention wherein the facets of the first reflective zone are planar the deficiencies of the prior art systems are overcome in that planar facets are relatively simple and cheap to manufacture with high surface quality; field curvature of the array image is eliminated because these facets are planar as is divergence of the principal rays corresponding to different elements within the array even when the array is large and consequently there is no need to provide additional optical components such as compensators when a large array is used.

Although the facets of the first reflective zone are planar in accordance with the present invention the facets of the second reflective zone need not be planar since specific applications may require or benefit from the second reflective zone having curved facets with either cylindrical or spherical curvature. Also, the static optical means which directs radiation between the two reflection stations may be arranged to handle divergent, convergent or parallel beam radiation reflected at the second reflection station.

It will be evident that the present invention can be practiced by preselecting the angles $\alpha$ and $\psi$ and thereafter disposing the focussing means with respect to the rotor assembly so that angle $\beta$ conforms to the preceding relationship. In particular it is possible to unify the respective facets of the first and second reflective zones on individual planar reflective surfaces (in which case the facets of the second reflective zone are necessarily planar) thereby further simplifying the manufacture of the rotor assembly. This arrangement is possible provided the facets of the second reflective zone are planar and whether or not these facets are parallel to the axis of rotation of the rotor assembly.

Embodiments of the present invention will now be described by way of example with reference to the accompanying drawings, in which:

FIG. 1 illustrates the prior art;

FIG. 2 diagrammatically illustrates a first embodiment of the present invention;

FIG. 3 diagrammatically illustrates a second embodiment of the present invention;

FIG. 4 illustrates a modified version of the first embodiment of the present invention in conjunction with a frame scanner; and FIG. 5 illustrates a different modified version of the FIG. 2 embodiment to show the relationship of the components with a large array detector.

The prior art system depicted in FIG. 1 comprises a rotor assembly 10 rotatable about axis 11 and having a first reflective zone 12 composed of curved facets 12A, 12B, 12C etc. and a second reflective zone 13 composed of planar facets 13A, 13B, 13C etc. A parallel beam 9A of radiation is incident upon a converging lens 14 which focusses this radiation at a first reflection station through which the facets 12A, 12B, 12C sequentially pass which results in the reflected cone 9B of radiation pivoting about this reflection station. This reflected radiation cone 9B is gathered by an elongate concave mirror 15 the principal focus of which is coincident with the apex of the reflected radiation cone 9B thereby producing a parallel radiation beam which is directed towards a second reflection station through which the facets 13A, 13B, 13C sequentially pass as a result of which the reflected parallel beam 9C traverses a scan locus 16.

There are various practical considerations which determine the nature of the system of FIG. 1 some of which are equally applicable to conventional single-reflection scan systems. For example, the information carrying capacity of the system is directly proportional to the diameter (D) of the reflective zone 13 and inversely proportional to the square of the number (N) of facets therein whilst the windage losses to be overcome during rotation of the assembly 10 are proportional to the fifth power of the diameter (D). To provide a suitable compromise in which windage losses are small but information carrying capacity is high practical assemblies are of limited diametrical size (D) and small number (N) of facets. For example N is usually of the order of ten or less.

In the dual-reflection scan system of FIG. 1 there is an additional consideration arising from the tracking movement imposed on beam 9B by the reflective zone 12. If the half cone angle of the radiation cone formed by the lens 14 is denoted $\alpha$ the radiation beam 9B has its principal ray swept through 2 $\alpha$ if the facets 12A, 12B, 12C etc. are assumed to be planar and because beam 9B is itself a cone of half angle $\alpha$ mirror 15 requires to have an angular extent of 4 $\alpha$. Thus the theoretical maximum value of $\alpha$ is 2 $\pi/4$ (90°) giving rise to mirror 15 having an angular extent of 2 $\pi$. From practical considerations however mirror 15 can only be manufactured with an angular extent of the order of $\pi/2$ or less and lens 14 can only be manufactured with $\alpha$ of the order of $\pi/4$ or less and this combination of practical and theoretical limitations results in the restriction that, assuming facets 12A, 12B etc. to be planar, $\alpha$ is of the order of $\pi/8$ or less.

However, as has been explained in DOS No. 3022365 successful tracking of the moving facets 13A, 13B, 13C etc. is dependent upon the curvature of facets 12A, 12B 12C etc. conforming to a predetermined relationship and, given the practical limitations discussed above, the solution where facets 12A, 12B etc. are planar, i.e. curvature is infinite, is impractical. In consequence scan systems which are practical to implement based on the disclosure of DOS No. 3022365 and U.K. No. 1419940 of practical necessity utilise curved facets 12A, 12B, 12C etc. and these give rise to the limitations discussed previously as regards manufacturing complexity, cost and field curvature.

We have now discovered that these limitations can in fact be overcome and the practical considerations met with planar facets if the angular orientation of these facets with respect to the axis of rotation is correlated with the half cone angle of the radiation incident on the facet and with the angle of incidence of the principal ray of the radiation cone on the facets.

FIG. 2 schematically illustrates the orientation of the components in accordance with the present invention. Thus radiation traversing lens 14 is, as previously, focussed on the reflective zone 12, the facets 12A, 12B etc. of which each have a normal 17 inclined at an angle $\psi$ to the rotation axis 11 of the assembly 10. The cone of radiation has a half angle $\alpha$ and the principal ray of the incident and reflected beams each subtend an angle $\beta/2$ to the normal 17' at the point of incidence when that normal 17' is coplanar with the principal rays. In accordance with the present invention these angles conform to the relationship:

$$\sin \psi \cdot \cos \beta/2 = \frac{\alpha \cdot N}{360} \text{ ($\alpha$ in degrees)}$$

from which it will be evident that if facets 12A, 12B etc. lie parallel to axis 11 so that $\psi = 90°$ and practical values of $\alpha$ and N are selected, such as $\alpha = \pi/8$ rads ($= 180/8$ degrees) and N=8 the relationship becomes $$\cos \beta/2 = \frac{180}{8} \cdot \frac{8}{360}$$

$$= 0.50$$

from which $\beta/2 = 60°$ and consequently $\beta$, which is the offset angle between the principal rays of the radiation beam before and after reflection from zone 12, is 120 degrees.

Also, as angle $\psi$ decreases in value from 90° towards the value shown in FIG. 2 (about 15°) so $\cos \beta/2$ increases in value and consequently $\beta/2$ decreases in value so that if it is desired to constrain the offset angle $\beta$ to a small value as has been the practise in the prior art previously discussed this can be achieved in accordance with the present invention as illustrated in FIG. 2 (whilst $\beta$ is sufficiently large to avoid obscuration). Incidentally, because of the considerable disparity between the angles of the facets 12A, 12B and facets 13A, 13B with respect to axis 11 in FIG. 2 it is necessary to introduce a planar fold mirror 18 which in combination with concave mirror 15 directs the radiation between the zones 12, 13.

FIG. 3 schematically illustrates the present invention with angle ψ equal to 90° in the particular case where the facets of zone 13 are parallel to axis 11. In this case pairs of facets 12A, 13A etc. merge to form a single reflective surface the central portion of which performs the function of facets 12A etc. Clearly this arrangement simplifies manufacture of the assembly 10.

Although in describing the present invention with reference to FIGS. 2 and 3 mirrors 15 and 18 together function as a collimator this need not be the case because these static optical components could focus the scanned radiation after reflection from zone 13 if this were required as is frequently the case. Furthermore components 15 and 18 need not take the specific form illustrated but, for example, could be associated with refractive components to achieve the same function. By way of example of a case where components 15 and 18 provide a focus for the scanned radiation there is illustrated in FIG. 4 a raster scanner wherein the second direction of scan is provided by an oscillating mirror 20 and a second concave mirror 21 arranged as described in U.K. Patent Specification No. 1586099 with respect to the circular locus 22 traversed by the focussed radiation emanating from concave mirror 15 so that the beam incident on mirror 20 is parallel.

One of the most important applications of the present invention is in thermal imaging in which case the array previously referred to incorporates a plurality of cryogenically cooled detector elements located in a housing having a cold shield placed a short distance in front of the array and forming an aperture stop. This is illustrated in FIG. 5 where numeral 25 depicts the housing, 26 the array, and 27 the cold shield or stop. In this case it is desirable that only radiation from the scanned scene 28 should be received by the array 26 and if this is to be achieved without oversizing of the scanner assembly 10 the stop 27 and the scan pupil 24 require to be at conjugate positions whilst the array 26 is imaged at the reflective zone 12. This is achieved by oversizing lens 14 sufficiently to accommodate all rays from the array 26 and traversing the stop 27 and arranging concave mirror 15 to image the stop 27 at a location 29 as far in front of the reflective zone 13 as the scan pupil 24 is behind the zone 13 when each facet 13A, 13B etc. is at the centre of the scanned field. The parallel bundles of rays corresponding to different detector elements in the array 26 then appear to diverge from the same position as the scan pupil 24 and the advantages discussed in U.S. Pat. No. 4,029,389 are thereby attained. It will be noted that in the FIG. 5 layout fold mirror 18 folds both the incident and reflected radiation cones from zone 12. This arrangement permits very small offset angles β to be achieved.

What is claimed is:

1. An optical scanning system comprising a rotor assembly having first and second reflective zones each composed of a plurality (N) of circumferentially-contiguous facets, respective facets of the first zone being angularly coextensive with respective facets of the second zone and sequentially passing through respective first and second reflection stations upon rotation of the rotor assembly about its axis of rotation, static focussing means arranged to direct radiation in a beam between an array of radiation detectors or emitters and the first-reflection station with the array and the first reflection station located at conjugate foci of the focussing means, and static optical means arranged to direct radiation in a beam between the first and second reflection stations, wherein (a) the facets of the first reflective zone are each planar having a normal disposed at an angle ψ to the rotation axis of the rotor assembly, (b) the incident and reflected radiation beams at the first reflection station each have a half cone angle α and the principal ray of the incident and reflected beams each subtend an angle β/2 to the normal of each facet in the first reflection station when each said normal is coplanar with said principal rays, and (c) the angles α, β and ψ conform to the relationship:

$$\sin \psi \cdot \cos \beta/2 = \frac{\alpha \cdot N}{360} \text{ (α in degrees).}$$

2. A system as claimed in claim 1, wherein the facets of the second reflective zone are each planar.

3. A system as claimed in claim 2, wherein respective facets of the first and second reflective zones are formed on a single planar reflective surface, and the rotor assembly is formed of a plurality of said reflective surfaces.

4. A system as claimed in claim 1, wherein the angle ψ is 90°.

* * * * *